(12) United States Patent
Partridge et al.

(10) Patent No.: US 7,426,702 B2
(45) Date of Patent: *Sep. 16, 2008

(54) SYSTEM AND METHOD FOR MULTIMEDIA DISPLAY

(75) Inventors: Charles W. Partridge, Wylie, TX (US); Ronald W. Barber, Plano, TX (US); Mark R. Lee, Richardson, TX (US); Douglas R. Holub, Irving, TX (US)

(73) Assignee: AMX LLC, Richardson, TX (US)

( * ) Notice: Subject to any disclaimer, the term of this patent is extended or adjusted under 35 U.S.C. 154(b) by 810 days.

This patent is subject to a terminal disclaimer.

(21) Appl. No.: 10/681,984

(22) Filed: Oct. 9, 2003

(65) Prior Publication Data
US 2004/0075694 A1      Apr. 22, 2004

Related U.S. Application Data

(63) Continuation of application No. 09/328,039, filed on Jun. 8, 1999, now Pat. No. 6,657,646.

(51) Int. Cl.
*G06F 3/048* (2006.01)
(52) U.S. Cl. .................. 715/835; 345/619; 715/760
(58) Field of Classification Search ............. 345/716, 345/619; 715/835, 760, 762, 764
See application file for complete search history.

(56) References Cited

U.S. PATENT DOCUMENTS

| | | |
|---|---|---|
| 3,597,743 A | 8/1971 | Murphy et al. |
| 3,778,542 A | 12/1973 | Hanseman |
| 4,024,505 A | 5/1977 | Sperling |
| 4,251,858 A | 2/1981 | Cambigue et al. |
| 4,503,497 A | 3/1985 | Krygowski et al. |
| 4,530,069 A | 7/1985 | Desrochers |
| 4,700,230 A | 10/1987 | Pshtissky et al. |
| 4,790,003 A | 12/1988 | Kepley et al. |
| 4,876,651 A | 10/1989 | Dawson et al. |
| 4,882,747 A | 11/1989 | Williams |

(Continued)

FOREIGN PATENT DOCUMENTS

EP    0449632 A    10/1991

(Continued)

OTHER PUBLICATIONS

Gopal, Inder S., et al. Dynamic Address Assignment in Broadcast Networks' IEEE Transactions on Communications, vol. COM-34, No. 1, Jan. 1986, pp. 31-37 XP000811899.

(Continued)

*Primary Examiner*—William L. Bashore
*Assistant Examiner*—Meseker Takele
(74) *Attorney, Agent, or Firm*—Gardere Wynne Sewell LLP (57) ABSTRACT

A system of multimedia display on a monitor screen includes at least one graphics source, a display file defining a page having a plurality of buttons, where each button has a set of properties including a specification of a graphics source. The system further includes a graphics controller operable to generate a pixel map, and a graphics arbitrator coupled to the graphics controller operable to select pixels between the pixel map and pixels from the at least one graphics source to be displayed for the page according to the display file.

54 Claims, 4 Drawing Sheets

U.S. PATENT DOCUMENTS

| | | |
|---|---|---|
| 4,904,993 A | 2/1990 | Sato |
| 4,914,527 A | 4/1990 | Asai et al. |
| 4,953,194 A | 8/1990 | Hansen et al. |
| 4,989,081 A | 1/1991 | Miyagawa et al. |
| 5,014,193 A | 5/1991 | Garner et al. |
| 5,039,980 A | 8/1991 | Aggers et al. |
| 5,051,720 A | 9/1991 | Kittirutsunetorn |
| 5,056,001 A | 10/1991 | Sexton et al. |
| 5,072,374 A | 12/1991 | Sexton et al. |
| 5,086,385 A | 2/1992 | Launey et al. |
| 5,095,480 A | 3/1992 | Fenner |
| 5,103,391 A | 4/1992 | Barrett |
| 5,109,222 A | 4/1992 | Welty |
| 5,119,479 A | 6/1992 | Arai et al. |
| 5,144,548 A | 9/1992 | Salandro |
| 5,226,160 A | 7/1993 | Waldron et al. |
| 5,233,510 A | 8/1993 | Brueckner et al. |
| 5,276,630 A | 1/1994 | Baldwin et al. |
| 5,276,793 A | 1/1994 | Borgendale et al. |
| 5,311,451 A | 5/1994 | Barrett |
| 5,317,562 A | 5/1994 | Nardin et al. |
| 5,347,632 A | 9/1994 | Filepp et al. |
| 5,371,859 A | 12/1994 | Lennartsson |
| 5,375,248 A | 12/1994 | Lemay et al. |
| 5,388,213 A | 2/1995 | Oppenheimer et al. |
| 5,410,326 A | 4/1995 | Goldstein |
| 5,428,470 A | 6/1995 | Labriola, II |
| 5,434,982 A | 7/1995 | Calzi |
| 5,444,851 A | 8/1995 | Woest |
| 5,446,740 A | 8/1995 | Yien et al. |
| 5,450,359 A | 9/1995 | Sharma et al. |
| 5,452,291 A | 9/1995 | Eisenhandler et al. |
| 5,455,959 A | 10/1995 | Simmering |
| 5,463,735 A | 10/1995 | Pascucci et al. |
| 5,467,264 A | 11/1995 | Rauch et al. |
| 5,481,750 A | 1/1996 | Parise et al. |
| 5,491,797 A | 2/1996 | Thompson et al. |
| 5,491,802 A | 2/1996 | Thompson et al. |
| 5,500,794 A | 3/1996 | Fujita et al. |
| 5,510,975 A | 4/1996 | Ziegler, Jr. |
| 5,519,707 A | 5/1996 | Subramanian et al. |
| 5,519,875 A | 5/1996 | Yokoyama et al. |
| 5,528,215 A | 6/1996 | Siu et al. |
| 5,528,739 A | 6/1996 | Lucas et al. |
| 5,537,142 A | 7/1996 | Fenouil |
| 5,537,663 A | 7/1996 | Belmont et al. |
| 5,557,723 A | 9/1996 | Holt et al. |
| 5,565,855 A | 10/1996 | Knibbe |
| 5,565,908 A | 10/1996 | Ahmad |
| 5,568,367 A | 10/1996 | Park |
| 5,568,489 A | 10/1996 | Yien et al. |
| 5,570,085 A | 10/1996 | Bertsch |
| 5,572,643 A | 11/1996 | Judson |
| 5,583,994 A | 12/1996 | Rangan |
| 5,586,267 A | 12/1996 | Chatwani et al. |
| 5,592,626 A | 1/1997 | Papadimitriou et al. |
| 5,594,366 A | 1/1997 | Khong et al. |
| 5,600,635 A | 2/1997 | Hamaki et al. |
| 5,630,079 A | 5/1997 | McLaughlin |
| 5,634,011 A | 5/1997 | Auerbach |
| 5,648,813 A | 7/1997 | Tanigawa et al. |
| 5,657,221 A | 8/1997 | Warman et al. |
| 5,675,756 A | 10/1997 | Benton et al. |
| 5,687,393 A | 11/1997 | Brown et al. |
| 5,689,353 A | 11/1997 | Darbee et al. |
| 5,699,532 A | 12/1997 | Barrett et al. |
| 5,706,455 A | 1/1998 | Benton et al. |
| 5,710,755 A | 1/1998 | Chen |
| 5,720,032 A | 2/1998 | Picazo, Jr. et al. |
| 5,721,878 A | 2/1998 | Ottesen et al. |
| 5,724,574 A | 3/1998 | Stratigos et al. |
| 5,729,704 A * | 3/1998 | Stone et al. .................. 715/804 |
| 5,732,257 A | 3/1998 | Atkinson et al. |
| 5,737,529 A | 4/1998 | Dolin, Jr. et al. |
| 5,737,553 A | 4/1998 | Bartok |
| 5,739,760 A | 4/1998 | Hatakeyama |
| 5,740,231 A | 4/1998 | Cohn et al. |
| 5,742,762 A | 4/1998 | Scholl et al. |
| 5,754,255 A | 5/1998 | Takamori |
| 5,764,155 A | 6/1998 | Kertesz et al. |
| 5,805,812 A | 9/1998 | Fish et al. |
| 5,812,085 A | 9/1998 | Barraza et al. |
| 5,812,122 A | 9/1998 | Ng |
| 5,812,214 A | 9/1998 | Miller |
| 5,812,750 A | 9/1998 | Dev et al. |
| 5,815,516 A | 9/1998 | Aaker et al. |
| 5,815,703 A | 9/1998 | Copeland et al. |
| 5,835,126 A | 11/1998 | Lewis |
| 5,844,572 A | 12/1998 | Schott |
| 5,848,054 A | 12/1998 | Mosebrook et al. |
| 5,857,199 A | 1/1999 | Tamano et al. |
| 5,867,484 A | 2/1999 | Shaunfield |
| 5,886,894 A | 3/1999 | Rakoff |
| 5,892,924 A | 4/1999 | Lyon et al. |
| 5,896,382 A | 4/1999 | Davis et al. |
| 5,907,837 A | 5/1999 | Ferrel et al. |
| 5,909,570 A | 6/1999 | Webber |
| 5,910,954 A | 6/1999 | Bronstein et al. |
| 5,918,022 A | 6/1999 | Batz et al. |
| 5,920,694 A | 7/1999 | Carleton et al. |
| 5,922,050 A | 7/1999 | Madany |
| 5,926,187 A | 7/1999 | Kim |
| 5,935,003 A | 8/1999 | Stephens et al. |
| 5,940,387 A | 8/1999 | Humpleman |
| 5,943,064 A | 8/1999 | Hong |
| 5,956,487 A | 9/1999 | Venkatraman et al. |
| 5,957,985 A | 9/1999 | Wong et al. |
| 5,959,536 A | 9/1999 | Chambers et al. |
| 5,968,116 A | 10/1999 | Day, II et al. |
| 5,977,989 A | 11/1999 | Lee et al. |
| 5,982,445 A | 11/1999 | Eyer et al. |
| 5,995,753 A | 11/1999 | Walker |
| 5,996,022 A | 11/1999 | Krueger et al. |
| 6,005,861 A | 12/1999 | Humpleman |
| 6,008,735 A | 12/1999 | Chiloyan et al. |
| 6,012,113 A | 1/2000 | Tucker |
| 6,021,433 A | 2/2000 | Payne et al. |
| 6,023,762 A | 2/2000 | Dean et al. |
| 6,029,092 A | 2/2000 | Stein |
| 6,038,668 A | 3/2000 | Chipman et al. |
| 6,049,821 A | 4/2000 | Theriault et al. |
| 6,049,828 A | 4/2000 | Dev et al. |
| 6,052,683 A | 4/2000 | Irwin |
| 6,055,236 A | 4/2000 | Nessett et al. |
| 6,055,368 A | 4/2000 | Kunioka |
| 6,061,602 A | 5/2000 | Meyer |
| 6,061,717 A | 5/2000 | Carleton et al. |
| 6,075,776 A | 6/2000 | Tanimoto et al. |
| 6,078,747 A | 6/2000 | Jewitt |
| 6,078,952 A | 6/2000 | Fielding et al. |
| 6,085,238 A | 7/2000 | Yuasa et al. |
| 6,085,243 A | 7/2000 | Fletcher et al. |
| 6,088,717 A | 7/2000 | Reed et al. |
| 6,101,189 A | 8/2000 | Tsuruoka |
| 6,105,055 A | 8/2000 | Pizano et al. |
| 6,108,696 A | 8/2000 | Mendhekar et al. |
| 6,115,713 A | 9/2000 | Pascucci et al. |
| 6,121,593 A | 9/2000 | Mansbery et al. |
| 6,133,847 A | 10/2000 | Yang |
| 6,144,993 A | 11/2000 | Fukunaga et al. |
| 6,160,796 A | 12/2000 | Zou |
| 6,161,133 A | 12/2000 | Kikinis |
| 6,161,145 A | 12/2000 | Bainbridge et al. |
| 6,167,567 A | 12/2000 | Chiles et al. |

| | | | |
|---|---|---|---|
| 6,175,920 B1 | 1/2001 | Schanze | |
| 6,177,945 B1 * | 1/2001 | Pleyer | 345/473 |
| 6,192,282 B1 | 2/2001 | Smith et al. | |
| 6,195,688 B1 | 2/2001 | Caldwell et al. | |
| 6,198,479 B1 | 3/2001 | Humpleman et al. | |
| 6,199,133 B1 | 3/2001 | Schnell | |
| 6,240,554 B1 | 5/2001 | Fenouil | |
| 6,241,156 B1 | 6/2001 | Kline et al. | |
| 6,259,707 B1 | 7/2001 | Dara-Abrams | |
| 6,260,069 B1 | 7/2001 | Anglin | |
| 6,266,339 B1 | 7/2001 | Donahue et al. | |
| 6,272,134 B1 | 8/2001 | Bass et al. | |
| 6,288,716 B1 | 9/2001 | Humpleman et al. | |
| 6,292,901 B1 | 9/2001 | Lys et al. | |
| 6,310,879 B2 | 10/2001 | Zhou et al. | |
| 6,330,238 B1 | 12/2001 | Ooe | |
| 6,338,152 B1 | 1/2002 | Fera et al. | |
| 6,342,906 B1 | 1/2002 | Kumar et al. | |
| 6,360,270 B1 | 3/2002 | Cherkasova et al. | |
| 6,363,422 B1 | 3/2002 | Hunter et al. | |
| 6,415,328 B1 | 7/2002 | Korst | |
| 6,434,157 B1 | 8/2002 | Dube et al. | |
| 6,434,680 B2 | 8/2002 | Belknap et al. | |
| 6,437,691 B1 | 8/2002 | Sandelman et al. | |
| 6,446,130 B1 | 9/2002 | Grapes | |
| 6,456,699 B1 | 9/2002 | Burg et al. | |
| 6,469,695 B1 | 10/2002 | White | |
| 6,469,987 B1 | 10/2002 | Rijhsinghani | |
| 6,477,569 B1 | 11/2002 | Sayan et al. | |
| 6,484,061 B2 | 11/2002 | Papadopoulos et al. | |
| 6,484,149 B1 | 11/2002 | Jammes et al. | |
| 6,496,927 B1 | 12/2002 | McGrane et al. | |
| 6,505,146 B1 | 1/2003 | Blackmer | |
| 6,515,680 B1 * | 2/2003 | Hendricks et al. | 715/716 |
| 6,523,696 B1 | 2/2003 | Saito et al. | |
| 6,542,165 B1 | 4/2003 | Ohkado | |
| 6,546,405 B2 | 4/2003 | Gupta et al. | |
| 6,553,418 B1 | 4/2003 | Collins et al. | |
| 6,574,234 B1 | 6/2003 | Myer et al. | |
| 6,609,127 B1 | 8/2003 | Lee et al. | |
| 6,615,088 B1 | 9/2003 | Myer et al. | |
| 6,657,646 B2 | 12/2003 | Partridge et al. | |
| 6,680,934 B1 | 1/2004 | Cain | |
| 6,697,376 B1 | 2/2004 | Son et al. | |
| 6,744,771 B1 | 6/2004 | Barber et al. | |
| 6,760,760 B1 | 7/2004 | McGrane | |
| 6,763,040 B1 | 7/2004 | Hite et al. | |
| 6,775,654 B1 | 8/2004 | Yokoyama et al. | |
| 6,791,554 B1 | 9/2004 | Mergard et al. | |
| 6,801,529 B1 | 10/2004 | McGrane et al. | |
| 6,829,368 B2 | 12/2004 | Meyer et al. | |
| 6,865,596 B1 | 3/2005 | Barber et al. | |
| 6,868,403 B1 | 3/2005 | Wiser et al. | |
| 6,934,414 B2 | 8/2005 | Kondo et al. | |
| 6,937,766 B1 | 8/2005 | Wilf et al. | |
| 7,076,153 B2 | 7/2006 | Ando et al. | |
| 7,224,366 B2 | 5/2007 | Kessler et al. | |
| 2002/0013948 A1 | 1/2002 | Aguayo et al. | |
| 2002/0176601 A1 | 11/2002 | Rhoads | |
| 2003/0035556 A1 | 2/2003 | Curtis et al. | |
| 2003/0149574 A1 | 8/2003 | Rudman | |
| 2004/0034864 A1 | 2/2004 | Barrett et al. | |
| 2004/0044742 A1 | 3/2004 | Evron et al. | |
| 2004/0085361 A1 | 5/2004 | Kessler et al. | |
| 2004/0196255 A1 | 10/2004 | Cheng | |

FOREIGN PATENT DOCUMENTS

| | | |
|---|---|---|
| EP | 0530973 A1 | 10/1993 |
| EP | 0626635 A2 | 11/1994 |
| EP | 0658899 A2 | 5/1995 |
| EP | 0743595 A | 5/1996 |
| EP | 0798894 | 10/1997 |
| EP | 0812086 | 12/1997 |
| EP | 0841615 A | 5/1998 |
| EP | 0841616 A | 5/1998 |
| EP | 0915469 A2 | 5/1999 |
| EP | 0939517 A1 | 9/1999 |
| JP | 10276478 | 10/1998 |
| WO | WO 95/21415 A | 8/1995 |
| WO | WO 96/24231 A | 8/1996 |
| WO | WO 97/18636 | 5/1997 |
| WO | WO 97/26587 | 7/1997 |
| WO | WO 97/44747 | 11/1997 |
| WO | WO 98/00788 | 1/1998 |
| WO | WO9811510 | 3/1998 |
| WO | WO 98/36335 | 8/1998 |
| WO | WO 98/36336 A | 8/1998 |
| WO | WO 98/53581 | 11/1998 |
| WO | WO 99/03255 | 1/1999 |
| WO | WO 99/05584 A | 2/1999 |
| WO | WO 99/24905 | 5/1999 |
| WO | WO 00/28403 | 5/2000 |
| WO | WO 00/67135 | 11/2000 |
| WO | WO 00/75738 A1 | 12/2000 |
| WO | WO 00/75903 A2 | 12/2000 |

OTHER PUBLICATIONS

Loucks E M et al. "Implementation of a Dynamic Address Assignment Protocol in a Local Area Network" Computer Networks and ISDN Sys., vol. 11, No. 2, Feb. 1986, pp. 133-146.
C. Hedrick, "Routing Information Protocol," RFC 1058, Jun. 1988, pp. 1-29.
Tsuchiya P F "Efficient Utilization of Two-Level Hierarchical Addresses," IEEE, vol. -, Dec. 6, 1992, pp. 1016-1021, XP000357710 ISBN: 0-7803-0608-2.
AXCESS Language Tutorial—Version 2.1, Mar. 1993.
R. Droms, "Dynamic Host Configuratiion Protocol," RFC 1541, Oct. 1993, pp. 1-34.
Comer, Douglas E. "Internetworking With TCP/IP" vol. 1, Principles, Protocols, and Architecture, published 1995, pp. 89-94, 203-207 and 291-292 (1995).
Qunjie Wang et al., "EM-an environment manager for building networked virtual environments" IEEE Virtual Reality Annual Intern. Symp., pp. 11-18, Mar. 1995.
8.5" Touch Panels, Oct. 1995.
F. Halsall, "Data Communications, Computer Networks and Open Systems," Addison-Wesley, p. 45-46 and 285-292 (1996)—XP-002162277.
Andrew Tanenbaum,"Computer Networks," Prentice Hall International (London), p. 345-403 (1996); XP-002155220.
P.M. Corcoran et al: "CEBus Network Access via the World Wide Web," p. 236-237, IEE Transactions on Consumer Electronics, Aug. 1996.
10.4" Color LCD Tiltscreens, Oct. 1997.
Powered By AXlink, Oct. 1997.
"Crestron SpectrumTM STX-3500C 2 Way RF Wireless Touchscreen Control Panel," Crestron Remote Control Systems, Nov. 1997.
Peter M. Corcoran, et al., "Browser-Style Interfaces to a Home Automation Network," IEEE Transactions on Consumer Electronics, vol. 43 (No. 4), p. 1063-1069 (Nov. 1, 1997).
Gagnon F. et al., "On the Development of a Generic Interface for HLA and DIS Simulations," IEEE 1998, pp. 52-59, XP-002138396.
Viewpoint Wireless Touch Panel, Jun. 1998.
New Products Infocomm '98, Jun. 1998.
Tilo Klesper, "Der Internet-Zugriff aufs LON / Weltweiter Zugriff auf die Sensorik..." Elektronik (Germany), vol. 47 (No. 8), p. 60, 62, 64 and 66-68 (Aug. 1998).
Research in Motion Ltd., "BlackBerry Technical White Paper", Version 1.0, dated 1998-1999, 17 pages.
Hill Associates, Inc. "Remote Access and TCP/IP," Colchester, Vermont, dated Jan. 1998, pp. 616.3.1-616.3.11.

Cucos, Alexander, et al. "Real Time ATM for remote access to Home Automation and Digital Home A/V Networks," IEEE, vol. 44 (No. 3) p. 482-489 (Jun. 17, 1998).

Khosia, R., "Human-centered virtual machine of problem solving agents, software agents, intelligent agents . . . ", IEEE High-Assurance Sys. Eng. Symp., pp. 312-319, Nov. 1998.

Global WebLinx, 1999.

Landmark Designer 2.2 User Guide (Preliminary Copy), Mar. 1, 1999.

AXB-TPI/3 Touch Panel Interface 3, May 1999.

U.S. Appl. No. 09/328,032 entitled "Method and System for Dynamically Assigning . . . " filed Jun. 8, 1999; Inventor: Barber et al.—now abandoned.

U.S. Appl. No. 09/328,922 entitled "System and Method for Monitoring Video Inputs" filed Jun. 9, 1999; Inventor: Aaron Myer—now abandoned.

U.S. Appl. No. 09/328,923 entitled "System and Method for Integrating . . . " filed Jun. 9, 1999; Inventor: Aaron Myer et al.—now abandoned.

Cisco and Infoseek Align With Panja to Bring Rich Internet Content to 2 Billion Consumer Devices, Jul. 19, 1999.

Panja WebLinx Server and Internet Development Kit (IDK) (Version 1.02 or higher) Instruction Manual, Oct. 1999.

Panja WebLinx Administrator Program (Version 1.0 or higher) Instruction Manual, Oct. 1999.

Global Connectivity Global WebLinx, 2000.

Panja Announces First Shipments of Panja 1000 Units, Jan. 24, 2000.

NetLinx Hub Cards and Modules—Instruction Manual, Mar. 2000.

U.S. Appl. No. 09/561,104 entitled "Internet Application Control System and Method" filed Apr. 28, 2000; Inventor: Thomas D. Hite—now abandoned.

U.S. Appl. No. 09/561,103 entitled "Dynamic Messaging System and Method" filed Apr. 28, 2000; Inventor: Thomas D. Hite et al.—now abandoned.

Pending U.S. Appl. No. 09/561,105 entitled "Internet Control System and Method" filed Apr. 28, 2000; Inventors: Thomas Hite et al.

NetLinx Master Cards and Modules—Instruction Manual—Preliminary, May 2000.

NetLinx CardFrame, Control Cards, and NetModules—Instruction Manual—Preliminary, May 2000.

NetLinx Programming Language—Instruction Manual, May 2000.

Panja Ethernet Gateway, May 2000.

Palm, Inc. "Web Clipping, Not Web Browsing" http://www.palm.com/products/palmvii/webclipping.html, dated May 25, 2000; 4 pages.

Aether Software "ScoutWebTM Web-Enabling the Mobile Enterprise" http://www.riverbedtech.com/scoutware/index.phtml?i=sw, dated May 25, 2000; 11 pages.

Palm OS® "Web Clipping Development" internet website article located at: http://www.palmos.com/dev/tech/webclipping/, dated May 25, 2000; 18 pages.

Omni Sky: Products and Services: Web "All the Web You Want" http://secure.omnisky.com/products... d$LGPZLPIAAAJLTQFINQGSFEWAVBWAYIV0, dated May 25, 2000; 9 pages.

Mapquest Corporate: Copyright information, internet website article located at: wysiwyg://89http://mapquest.c...ght &uid=udu49aj5i058jble:b5lf7w5u2, dated May 25, 2000; 10 pages.

YAHOO! Terms of Service, internet website article located at: http://docs.yahoo.com/info/terms/, dated May 25, 2000; 9 pages.

PANJA "What is the Panja 1000?" internet website article located at: wysiwyg://33/http://www.buyapanja.com/, dated May 25, 2000; 3 pages.

Cellular Unlimited "Cellular Unlimited Rogers AT&T . . . on Pagers and Wireless Web Browser" http://www.cantel-amigo.com/blackberry.html, dated May 25, 2000; 5 pages.

NetLinx Quick Setup Guide, Jun. 2000.

U.S. Appl. No. 09/589,576 entitled "Method and System for Providing Access . . . " filed Jun. 7, 2000; Inventor: Thomas D. Hite—now abandoned.

Landmark Designer—Instruction Manual—Preliminary, Oct. 2000.

U.S. Appl. No. 09/696,802, entitled "System and Method of Mining World Wide . . . " filed Oct. 25, 2000; Inventor: Subramanian et al. now abandoned.

NXI NetLinx Integrated Controller—Integrated Controllers—Instruction Manual—Preliminary, Nov. 2000.

Instruction Manual—VPXpress—Viewpoint System Design/Programming Software Program (Version 1.1 or higher), Jul. 2001.

Quick Start Guide—AXB-TPI/3—Touch Panel Interface 3, Oct. 2002.

TPDesign3—Touch Panel Design Program (Version 3.16), Dec. 2002.

Instruction Manual—10.4" Touch Panels (Firmware version G3), Jun. 2003.

CEROVIEW "Touch Screens" internet website article located at: www.ceroview.com/peripherals/touchspecs/touchtech.html dated May 11, 2004, 3 pages.

U.S.Appl. No. 10/859,015 entitled "Computer System With User Interface Having . . . " filed Jun. 2, 2004; Inventor: Champion et al.

AMX Revolutionizes Touch Panel Interaction with Launch of TakeNoteTM Interactive Collaboration Tool, Jun. 9, 2004.

Quick Start Guide, NXA-USBTN G4 USB Computer Control Stick with TakeNote, Jun. 9, 2004.

OSGI Alliance "About the OSGi Service Platform—Technical Whitepaper" pamphlet dated Jul. 12, 2004, Revision 3.0, 17 pages.

OSGI Allliance "OSGi Technology" internet website article located at: http://www.osgi.org/osgi_technology/index.asp?section=2 dated Aug. 6, 2004, 5 pages.

NetLinx Duet, Sep. 2004.

NetLinx Duet—Inconcert Partner Benefits, Sep. 2004.

AMX Extends NetLinx(TM) With Java(TM) for Industry's First Dual Language Control, Sep. 10, 2004.

NetLinx Master Firmware—Version 3.0, Sep. 10, 2004.

U.S. Appl. No. 10/992,087 entitled "Method and Computer Program for Implementing Interactive . . . " filed Nov. 18, 2004; Inventor: Kessler et al.

AMX Partners With Leading Manufacturers to Leverage Dynamic Device Discovery Technology, Jun. 8, 2005.

Mio R-1 Remote, Sep. 2005.

Quick Start Guide—Mio R-1 Remote Control Device, Sep. 2005.

Instruction Manual—Mio R-1 Remote Control Device, Sep. 2005.

Reissue U.S. Appl. No. 11/219,300, entitled "System and Method of Device Interface . . . " filed Sep. 2, 2005; Inventor: Aaron L. Myer et al.

U.S. Appl. No. 60/175,252 entitled "Method and Computer Program for . . . " filed Sep. 7, 2005; Inventors: Robert D. Ward et al.

U.S. Appl. No. 60/715,330 entitled "Remote Control with Power . . . " filed Sep. 7, 2005; Inventor: Michael S. Farmer et al.

U.S. Appl. No. 11/222,885 entitled "Method, System and Computer Program Using Standard Interfaces . . . " filed Sep. 9, 2005; Inventor: Barber et al.

AMX Instruction Manual—Standard NetLinx API (SNAPI) R 1.6.0, Dec. 19, 2005.

AMX Instruction Manual—CaféDuet TM—Integrated Development Environment for NetLinx Duet (version 1.7)—User's Guide, Apr. 6, 2006.

AMX Celebrates Significant Dynamic Device Discovery Protocol Milestones at Infocomm 2006, Jun. 7, 2006.

D. Goodman, *Chapter 10: All About Buttons*, The Complete Hypercard Handbook, Bantam Computer Books (US), pp. 161-183; Dec. 19, 1988.

AMX Instruction Manual— Design XPress for NetLinx Studio, Step-by-Step User's Guide, 2002.

AMX Instruction Manual—Design XPress for NetLinx Studio, On-Site Installer's Guide, 2002.

AMX Instruction Manual—Design XPress -Home Theater version 1.2, Advanced Programmer's Guide, 2003.

AMX Instruction Manual—Design XPress—Professional version 1.1, User-Interface Guide, 2004.

AMX Instruction Manual—Design XPress—Professional version 1.1, On-Site Installer's Guide, 2004.

AMX Instruction Manual—Design XPress -Professional version 1.1, Programmer's Guide, Aug. 11, 2004.

AMX Instruction Manual—Design XPress—Home Theater version 1.3, Programmer's Guide, 2005.

AMX Instruction Manual—Design XPress—Home Theater version 1.3, User Interface Guide, 2005.

AMX Instruction Manual—Design XPress—Home Theater version 1.3, On-Site Installer's, Guide, 2005.

AMX Instruction Manual—Design XPress for NetLinx Studio version 1.5, User Interface Guide, 2005.

AMX Instruction Manual—Design XPress for NetLinx Studio version 1.5, Programmer's Guide, 2005.

AMX Instruction Manual—Design XPress for NetLinx Studio, version 1.5, Installer's Guide, 2005.

* cited by examiner

FIG. 7

# SYSTEM AND METHOD FOR MULTIMEDIA DISPLAY

CROSS REFERENCE TO RELATED APPLICATION

This Application is a Continuation Application of U.S. patent application Ser. No., 09/328,039, filed Jun. 8, 1999 now U.S. Pat. No. 6,657,646, entitled: SYSTEM AND METHOD FOR MULTIMEDIA DISPLAY.

TECHNICAL FIELD OF THE INVENTION

This invention is related in general to the field of control systems, particularly to a system and method of multimedia display.

BACKGROUND OF THE INVENTION

In a control area network connecting various control devices, a monitor or user display device is often used to provide a current status information about the control area network. In many instances, it becomes desirable to feed multiple graphics information from a number of sources to the monitor for display simultaneously.

SUMMARY OF THE INVENTION

It has been recognized that it is desirable to provide a multimedia display on a monitor.

In one aspect of the invention, a system of multimedia display on a monitor screen includes at least one graphics source, a display file defining a page having a plurality of buttons, where each button has a set of properties including a specification of a graphics source. The system further includes a graphics controller operable to generate a pixel map, and a graphics arbitrator coupled to the graphics controller operable to select pixels between the pixel map and pixels from the at least one graphics source to be displayed for the page according to the display file.

In another aspect of the invention, a control area network having a multimedia display includes a master controller coupled to the control area network, and at least one control device coupled to the master controller via the control area network. The at least one control device includes at least two graphics sources, a display file defining a page having a plurality of buttons, each button having a set of properties including a specification of a graphics source, a graphics controller operable to generate a pixel map. A graphics arbitrator is coupled to the graphics controller and is operable to select pixels between the pixel map and pixels from the at least two graphics sources to be displayed on a monitor screen for the page according to the display file.

In yet another aspect of the invention, a method of multimedia display on a monitor screen includes composing a display file describing multiple buttons, each button having a set of properties including a specification of a graphics source, receiving a pixel from each graphics source, and generating a corresponding pixel in response to the display file. The generated pixel is then examined and a pixel is selected from the generated pixel and the corresponding pixels from the graphics sources in response to examining the generated pixel. The selected pixel is displayed on the monitor screen.

In yet another aspect of the invention, a method of multimedia display on a touch monitor screen in a control area network is provided. The method includes the steps of composing a display file describing multiple buttons, each button having a set of properties including a specification of a graphics source coupled to the control area network. Thereafter, the method includes receiving a pixel from each graphics source, generating a corresponding pixel in response to the display file, and examining the generated pixel. A pixel is then selected from the generated pixel and the corresponding pixels from the graphics sources in response to examining the generated pixel.

One technical advantage of the invention is the ability to display graphics content from multiple sources on a single page on a monitor screen.

BRIEF DESCRIPTION OF THE DRAWINGS

For a better understanding of the present invention, reference may be made to the accompanying drawings, in which.

DETAILED DESCRIPTION OF THE INVENTION

Figure 1:
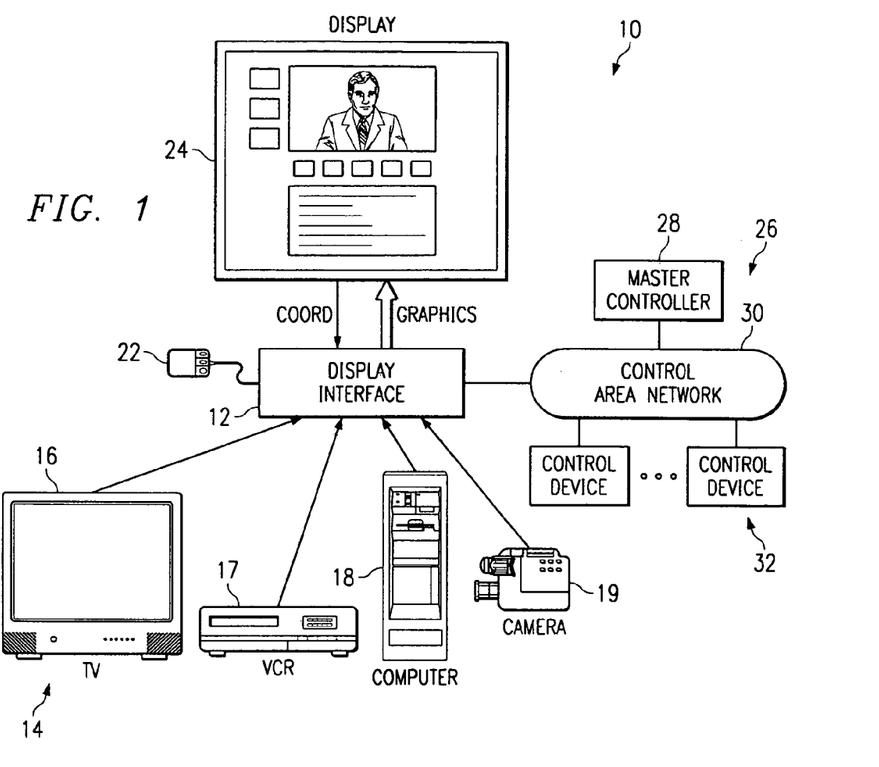
FIG. 1 is a simplified block diagram of an embodiment of a system for multimedia display according to the teachings of the present invention.

FIG. 1 is a simplified block diagram of an embodiment of a system for multimedia display 10 according to the teachings of the present invention. System 10 includes a display interface 12 which is operable to accept graphics and text input from a variety of sources 14. Graphics sources 14 may include a television 16 (or a receiver of television signals), a video cassette recorder (VCR) 17, a computer 18, and a camera 19. Other input sources may include digital video discs (DVD5), satellite receivers, video conferencing systems, etc. The inputs may be in the form of VGA, SVG, XGA, RGB, and other suitable formats. Display interface 12 is further operable to receive a pointing device, such as a mouse or touch pad 22. A display 24 such as a VGA monitor, RGB monitor, touch panel, etc. may be coupled to display interface 12. Display 24 may be a touch monitor or a monitor with a touch membrane overlay. Display 24 is operable to show a composite page consisting of one or more windows or "buttons" which display graphics from multiple sources 16-19 coupled to display interface 12.

Display interface 12 may be coupled to a control system 26, which may include a master controller 28, which is coupled to a control area network (CAN) 30. Also coupled to control area network 30 and under the control of master controller 28 are control devices 32. Control devices 32 may be lights, audio-visual equipment, user displays, security equipment, fire detection equipment, and other equipment and devices. Control devices 32 may include sources of graphics content, which may be communicated to master controller 28 via control area network 30 to display interface 12. Display 24 thus may also display content from graphics sources coupled to control area network 30.

Figure 2:
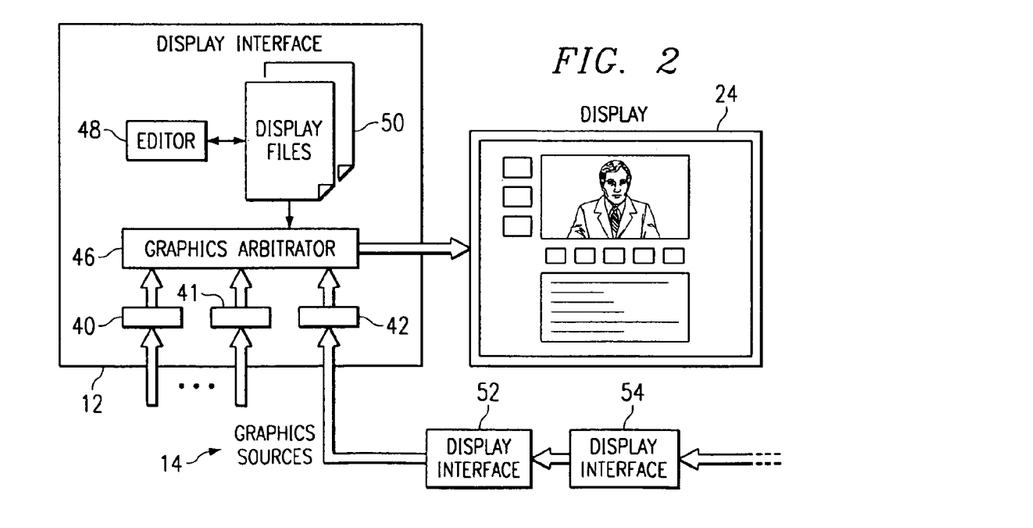
FIG. 2 is a more detailed block diagram of an embodiment of the display interface according to the teachings of the present invention.

FIG. 2 is a more detailed block diagram of an embodiment of the display interface 12 according to the teachings of the present invention. Display interface 12 includes one or more connectors or slots 40-42 to receive graphics sources 14. Graphics sources 14 may be coupled to graphics input cards or modules which may connect to connectors or slots 40-42. It may be seen that a graphics source for display interface 12 may be another display interface 52, which may in turn be coupled to yet another display interface 54 in a daisy chain fashion. Therefore, a graphics input source coupled to display interfaces 52 and 54 may be displayed on display 24 coupled to display interface 12 along with control devices 32 of control area network 30. Graphics sources 14 are coupled to a graphics arbitrator 46 via connectors 40-42. Graphics arbitrator 46 provides a graphics output that may include a combination of graphics generated internally, video information from all graphics sources 14 and other sources coupled to display interface 12. The graphics output is provided to and displayed by display 24.

Graphics arbitrator 46 generates the graphics output in response to display files 50, which are generated by an editor 48. A user or installer may initiate editor 48, which is an application program executing on a central processing unit (CPU) of display interface 12. The user may define and designate multiple windows or buttons in which graphics content from various sources 14 is displayed.

Figure 3:
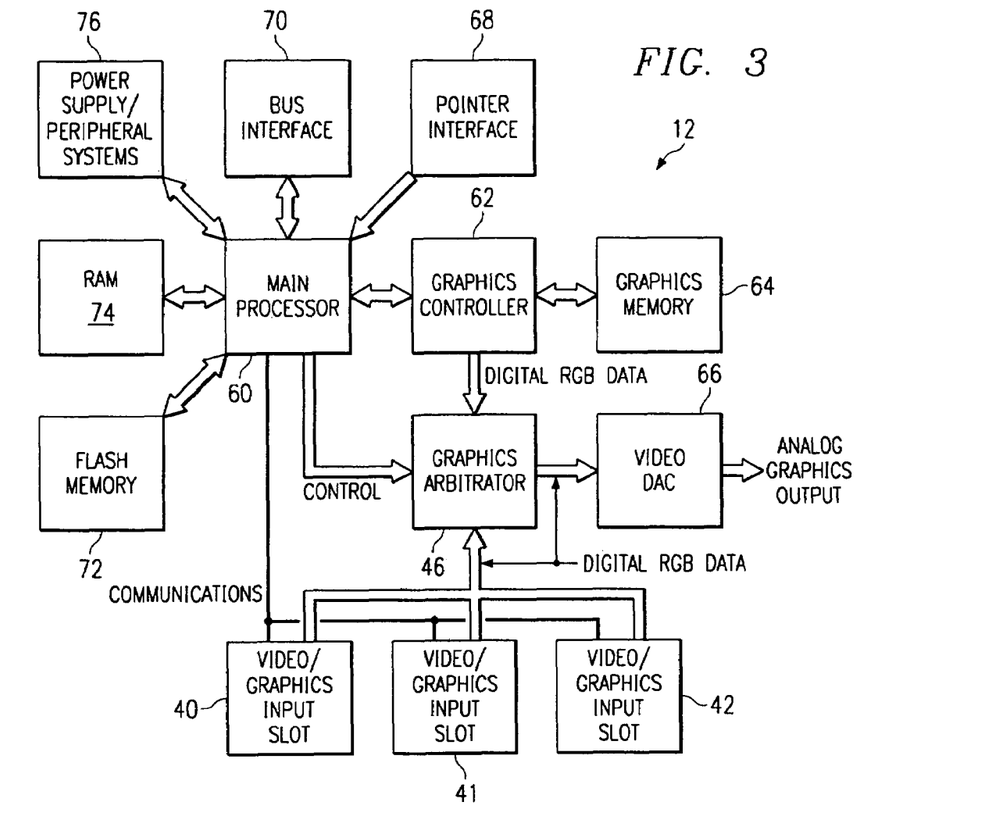
FIG. 3 is a detailed block diagram of an embodiment of the display interface according to the teachings of the present invention.

FIG. 3 is a detailed block diagram of an embodiment of the display interface 12 according to the teachings of the present invention. Display interface 12 includes three video/graphics input slots or connectors 40-42 for receiving graphics information from at least three graphics sources. In one embodiment, video graphics cards operable to receive and process certain particular types of graphics data may be plugged into slots 40-42. For example, a graphics card may be provided that is operable to couple to consumer-type sources, such as VCRs and DVD5. Such graphics card may include S-video input connectors and/or composite input connectors. Another graphics card may include RGB connectors operable to couple to RGB-type sources. Yet another graphics card may include VGA connectors for coupling with VGA-type sources. In general, the graphics cards are operable to decode a given type of video signal into 24-bit RGB, then buffering, scaling, and outputting a specific number of pixels at a time to graphics arbitrator 46 in sync with the horizontal and vertical sync signals from main processor 60. Main processor 60 may request a graphics card to scale its output image by sending it commands. The output image can be adjusted so that the active video data appears in the requested rectangular area. For example, main processor 60 may generate and send a SET OUTPUT RECTANGLE command message with the coordinates of the four corners of the output rectangle as parameters.

Coupled to video/graphics input slots 40-42 is graphics arbitrator 46. Graphics arbitrator is under the control of main processor 60. Main processor 60 also controls a graphics controller 62, which generates a pixel clock signal that cycles once for every pixel on the display. The pixel clock signal is distributed to video/graphics input slots 40-42 and is used as the main video timing signal. Graphics controller 62 also generates the internal graphics or RGB data for each pixel, which is provided to graphics arbitrator 46. Also provided to graphics arbitrator 46 are video or RGB data from one or more slots 40-42. Graphics arbitrator 46 is operable to select the correct pixel for output and provide it to a video digital-to-analog converter 66, which generates an analog graphics output.

Graphics controller 62 is coupled to a graphics memory 64 which provides data storage therefor. A pointer interface 68 is provided that may be coupled to a pointing device 22, such as a serial mouse. A bus interface 70 is provided for coupling and communicating with control area network 30. A flash memory 72, random access memory (RAM) 74, and a power supply/peripheral systems 76 are also included in display interface 12.

In operation, output pixel selection by graphics arbitrator 46 is performed by examining the color of each pixel arriving from graphics controller 62. Three predetermined colors have been selected as keys or indicators for the three slots. If a pixel is one of the three predetermined colors, then the pixel from the corresponding slot is selected as the output. If the pixel is of any other color, the graphics controller video graphics is chosen as the output source for that pixel. Therefore, graphics arbitrator examines the color of each pixel as it arrives from graphics controller 62. If the color of a given pixel is not one of the key colors, then the pixel is passed to video digital-to-analog converter 66 unchanged. If the pixel color is one of the key colors, then the pixel coming from the selected slot is passed to the output.

Figure 4:
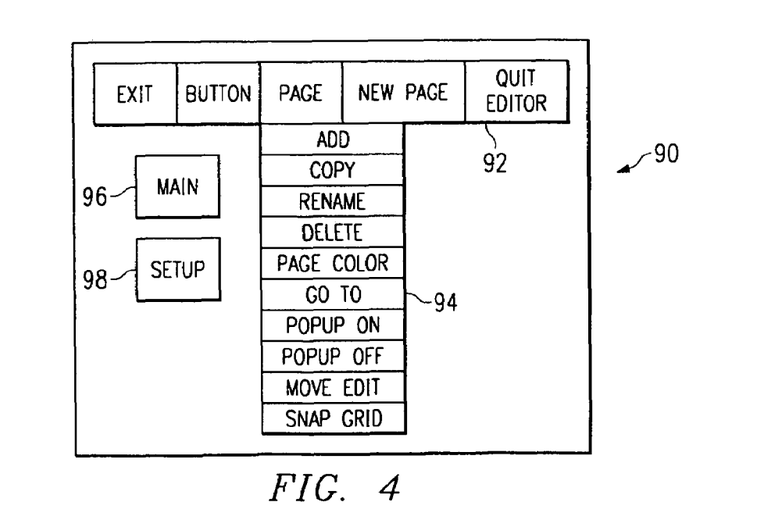
FIG. 4 is an exemplary screen of a main editor page with a page editing menu according to the teachings of the present invention.

FIG. 4 is an exemplary screen of a main editor page 90 of editor 48 (FIG. 2) with a page editing menu according to the teachings of the present invention. Editor 48 is used to create and define the layout of the graphics display on the display monitor. Main editor page 90 may include an edit tool bar 92, which may include options: EXIT, BUTTON, PAGE, NEW PAGE, and QUIT EDITOR. A drop-down menu 94 for the PAGE option is shown, which includes several actions such as: add, copy, rename, delete, page color, go to, pop-up on, pop-up off, move editor, and snap grid. A page may be defined as a window which may occupy the entire or a portion of the display monitor screen. A page may include one or more buttons in which graphics content may be displayed. Also included may be a main button 96 for navigating to a main page and a setup button 98 for navigating to a setup page.

Figure 5:
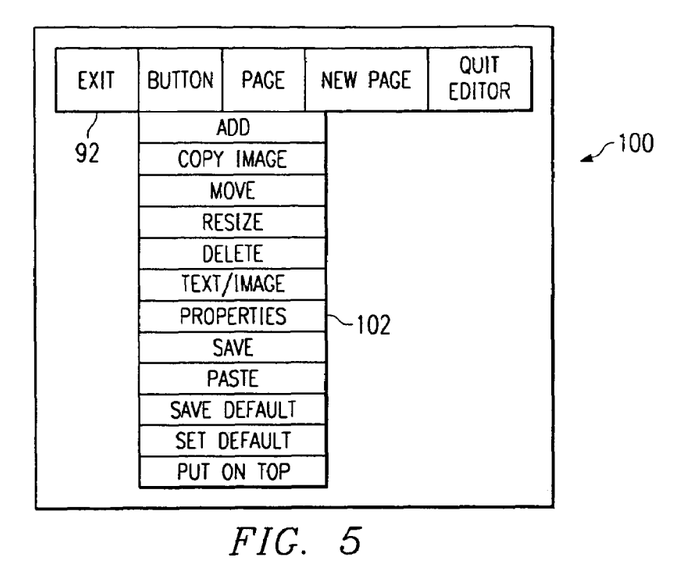
FIG. 5 is an exemplary screen of a main editor page with a button editing menu according to the teachings of the present invention.

FIG. 5 is an exemplary screen of a main editor page 100 with a button editing menu according to the teachings of the present invention. Main editor page 100 may include a edit tool bar 92 with a button pull-down menu 102 shown. Button pull-down menu 102 may include actions: add, copy image, move, resize, delete, text/image, properties, save, paste, save default, set default, and put on top.

Figure 6:
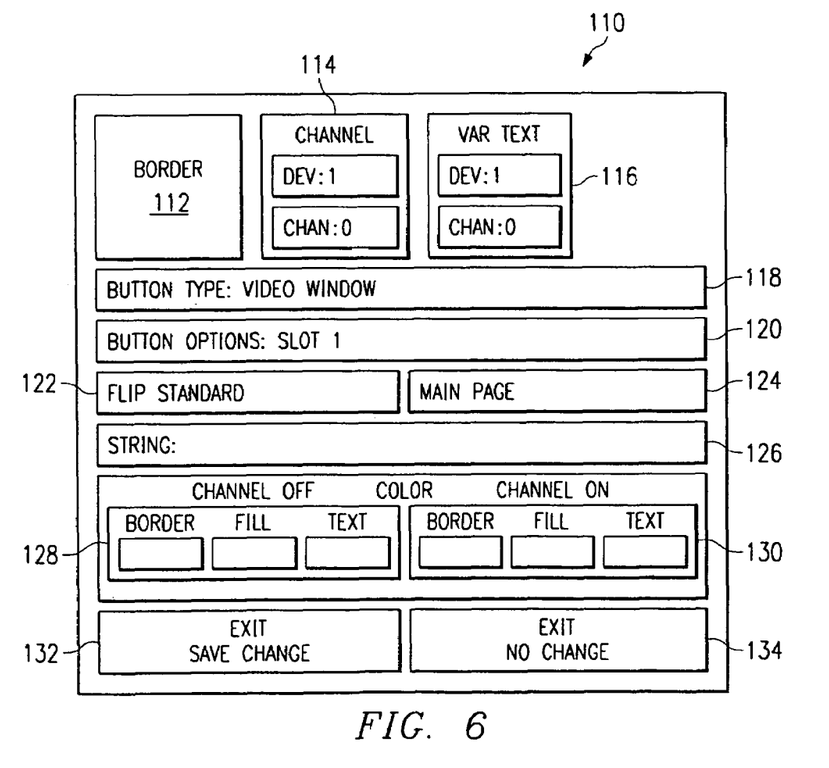
FIG. 6 is an exemplary screen of a button property editing page according to the teachings of the present invention.

When the properties action is selected from button pull-down menu 102, an exemplary screen of a button property editing page 110 according to the teachings of the present invention is shown in FIG. 6. A video window is a type of button used to display a video feed from a graphics source. Video window buttons can be moved, resized and customized. Button property editing page 110 includes a border button 112, for setting the button border. The button border property may include any number of ways to display or represent the border of the button, such as no border, single line, double line, triple line, single rounded, double rounded, single raised, double raised, 3D rectangle, 3D round, single diamond, etc. A button 114 is further provided in page 110 to set the channel code. The channel code allows a button to be associated with a specific function. A device (DEV) code is an identifier assigned to control devices coupled to master controller 28 via control area network 30 (FIG. 1). The CHAN designation on button 114 is the button channel assignment. Each device may have one or more channels. The next button, VAR TEXT 116, sets the variable text code for the channel and device assignments. The button type is set by the next field 118. Buttons may be of the following exemplary types: general, joystick, vertical bar graph, horizontal bar graph, keypad, keyboard, video window, etc. Button option 120 provides the user the ability to supply additional setup information about the button. For example, a video window button option would prompt the user to supply the slot number of the graphics source. Display interface then automatically detects the signal type of the graphics source connected to the given slot and set sets the video attributes accordingly. The user may be given the opportunity to fine tune and optimize the VGA or RGB picture quality of the video window. Flip type button 122 is used to specify a page flip type and the next button 124 is used specify the page to flip to. For example, if the user specifies "Flip Standard" and "Main Page", then when the present button is pushed, a page named "Main Page" is displayed. The next button, string 11, allows the user to specify a string associated with the button to be displayed.

Buttons 128 and 130 are used to set the channel-off and channel-on display conditions of the button. The color of the border, the fill color, and the text of the channel-off and channel-on conditions of the button are specified. When property editing is completed, the user may exit and save the changes by pressing on button 132, or exit without saving the changes by pressing on button 134.

Figure 7:
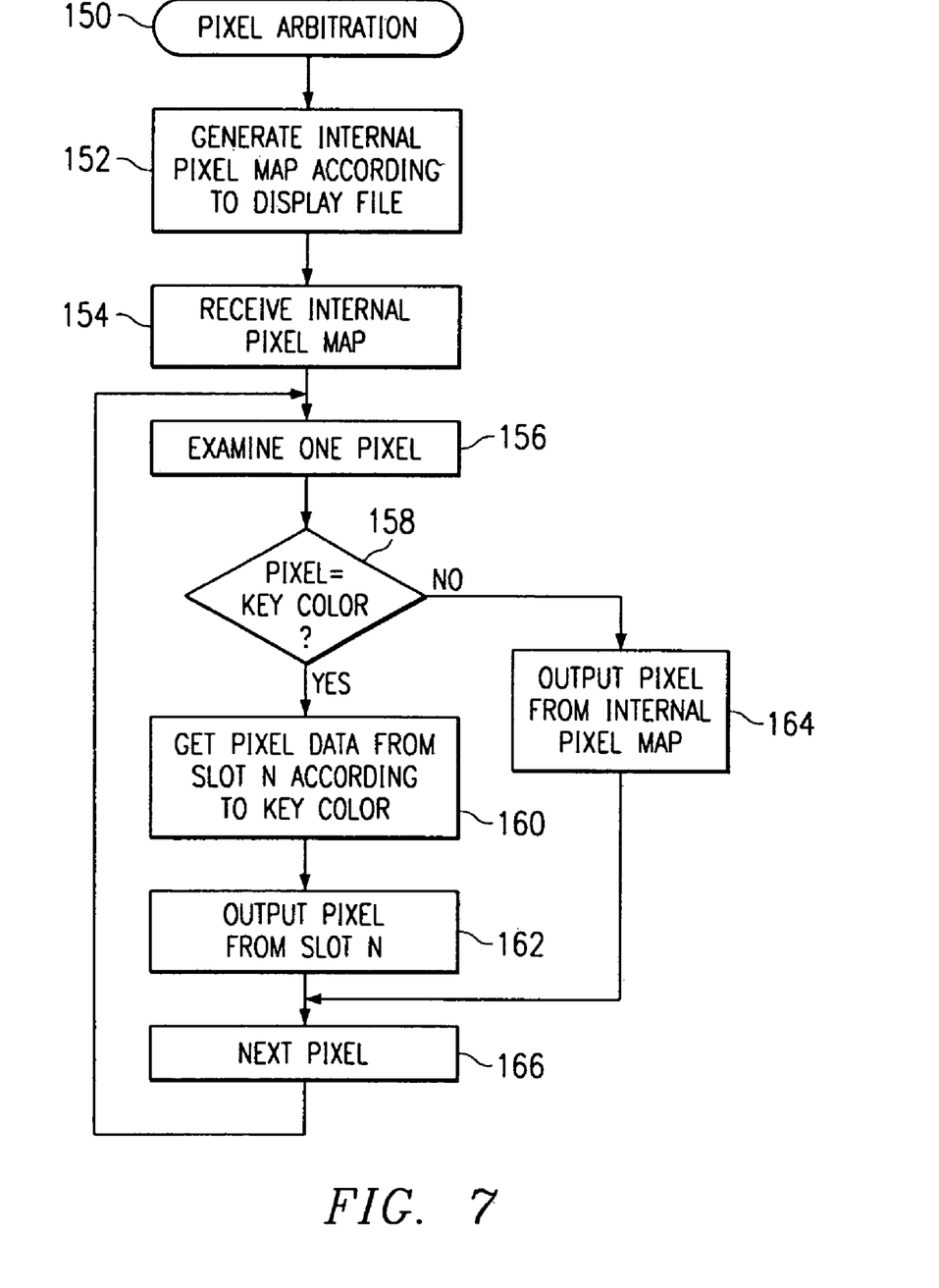
FIG. 7 is an exemplary flowchart of a graphics arbitration process according to the teachings of the present invention.

Referring to FIG. 7, a flowchart of an exemplary graphics arbitration process 150 of the present invention is shown. In block 152, graphics controller 62 generates an internal pixel map according to the display file. As described above, the display file contains the coordinates, size, and other information about the buttons on a given page. Some button properties may specify that video feed from one or more of the graphics sources 14 are to be displayed for a given button. In blocks 154 and 156, graphics arbitrator 46 receives the internal pixel map from graphics controller 62 and examines the value of one pixel. If the pixel color value is a predetermined key color, then the desired display for that pixel is from a video feed from one of the graphics sources rather than the graphics generated by graphics controller 62. As described above, each graphics source is assigned a color value which function as a key. When the special key color is encountered, it is indicative that the pixel from the graphics source represented by that key color is to be displayed. If the pixel has a color value that matches one of the key colors, as determined in block 158, then the pixel data from the slot represented by that key color is obtained from the specified slot and output to video digital-to-analog controller 66 for output to the monitor.

If in block 158 it is determined that the pixel value is not a key color, then the pixel data from the internal pixel map is provided as output to video digital-to-analog controller 66 for output to the monitor. In block 166, the next pixel in the internal pixel map is obtained, and execution loops back to block 156 to examine its value. This process continues until the display interface is powered down.

Operating in this manner, graphics content from a number of sources may be combined and displayed on a single page on a monitor screen. The graphics sources may be those devices directly connected to the display interface, devices coupled to one or more additional display interfaces which are coupled together, or devices coupled to a control area network.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for providing a multimedia display on a display device having a screen, said system comprising:
 a plurality of graphics information sources, each of said sources being uniquely identified by a corresponding graphic identifier element;
 a display file for defining a page to be displayed on said screen, said page comprising an array of page pixels, said page including at least one window disposed to receive graphics information from each of said sources;
 a graphics controller operable to generate an internal map comprising a set of map pixels, each of said map pixels corresponding to a page pixel of said page, each map pixel containing information that indicates the graphics information to be used with its corresponding page pixel, and at least some of said map pixels containing said graphic identifier elements;
 a graphics arbitrator disposed to examine each of said map pixels, said graphics arbitrator being operable, when an examined map pixel contains a graphic identifier element identifying a particular source, to provide at least a portion of the graphics information for the corresponding page pixel from said particular source; and
 said graphics arbitrator being further operable, when an examined map pixel contains none of said graphic identifier elements, to provide the graphics information for the corresponding page pixel from information contained in the examined map pixel.

2. The system of claim 1, wherein each of said graphic identifier elements comprises a key color value.

3. The system of claim 2, wherein each of said key color values is encoded in RGB format.

4. The system of claim 1, wherein said graphics arbitrator provides a graphics output that includes a combination of both internally generated graphics and video data from each of said sources, said output being directed to said screen for display.

5. The system of claim 4, wherein said displayed output is selectively scaled, so that said video data from said plurality of sources appears in a selected rectangular area on said screen.

6. The system of claim 1, wherein said page to be displayed includes a plurality of windows, each receiving graphics information from one or more of said sources.

7. The system of claim 1, wherein said graphics information sources include at least one device selected from a group that includes a television, a VCR and a computer, and said display device is selected from a group that includes a monitor and a touch panel.

8. The system of claim 1, wherein at least one of said graphics information sources comprises a component in a control area network.

9. A method for providing a multimedia display on a display device having a screen, said method comprising:
 identifying each of a plurality of graphics information sources by assigning respectively corresponding graphic identifier elements thereto;
 defining a page to be displayed on said screen, wherein said page comprises an array of page pixels;
 generating an internal map comprising a set of map pixels, wherein each of said map pixels corresponds to a page pixel of said page, each map pixel contains information that indicates graphics information to be used with its corresponding page pixel, and at least some of said map pixels contain said graphic identifier elements;

examining each of said map pixels;
when an examined map pixel contains a graphic identifier element identifying a particular source, providing at least a portion of the graphics information for the corresponding page pixel from said particular source; and
when an examined map pixel contains none of said graphic identifier elements, providing the graphics information for the corresponding page pixel from information contained in the examined map pixel.

10. The method of claim 9 wherein each of said graphic identifier elements comprises a key color value.

11. The method of claim 10, wherein each of said key color values is encoded in RGB format.

12. The method of claim 9, wherein a graphics output including a combination of graphics internally generated within a graphics arbitrator, and video data from each of said sources, is directed to said screen for display.

13. The method of claim 12, wherein said displayed output is selectively scaled, so that said video data from said plurality of sources appears in a selected rectangular area on said screen.

14. The method of claim 9, wherein said page to be displayed includes a plurality of windows, each receiving graphics information from one or more of said sources.

15. The method of claim 9, wherein said graphics information sources include at least one device selected from a group that includes a television, a VCR and a computer, and said display device is selected from a group that includes a monitor and a touch panel.

16. The method of claim 9, wherein at least one of said graphics information sources comprises a component in a control area network.

17. A system for providing multimedia on a display device, comprising:
one or more graphics sources, wherein each graphics source is configured to provide graphics information, each graphics source being identified by a corresponding graphic identifier;
a display file defining a page having a plurality of page pixels to be displayed on the display device, the page including at least one window, wherein each window is configured to display graphics information received from at least one of the graphics sources;
a graphics controller configured to generate an internal pixel map according to the display file; and
a graphics arbitrator configured to examine each pixel in the internal pixel map, the graphics arbitrator being operable, when an examined pixel contains a graphic identifier identifying at least one of the graphics sources, to provide the graphic information for the corresponding page pixel from the identified graphics source, and the graphics arbitrator being further operable, when the examined pixel does not contain a graphic identifier identifying at least one of the graphics sources, to provide the graphic information for the corresponding page pixel from the examined pixel.

18. The system of claim 17, wherein each graphics source is uniquely identified by a corresponding graphic identifier.

19. The system of claim 17, wherein each graphic identifier comprises a key color value.

20. The system of claim 17, wherein each window includes a set of properties.

21. The system of claim 17, wherein at least one of the graphics sources comprises a video cassette recorder.

22. The system of claim 17, wherein at least one of the graphics sources comprises a camera.

23. The system of claim 17, wherein at least one of the graphics sources comprises a television signal receiver.

24. The system of claim 17, wherein at least one of the graphics sources comprises a computer.

25. The system of claim 17, further comprising a control area network coupled to a display interface, wherein the display interface includes the at least one display file, the graphics controller and the graphics arbitrator.

26. The system of claim 25, wherein the control area network comprises:
a master controller;
at least one control device;
at least one graphics source; and
a network coupled to the master controller, the at least one control device, the at least one graphics source, and the display interface.

27. The system of claim 20, further comprising an editor configured to edit the window properties.

28. A control area network having a multimedia display, comprising:
a master controller coupled to the control area network;
at least one control device coupled to the master controller via the control area network, wherein the control area network is coupled to a display interface, the display interface comprising:
at least two graphics sources, each graphics source having an associated graphic identifier;
a display file defining a page having a plurality of buttons, each button having a set of properties and configured to display graphics information received from a specified graphics source;
a graphics controller configured to generate an internal pixel map; and
a graphics arbitrator configured to examine each pixel in the internal pixel map, the graphics arbitrator being operable, when an examined pixel contains a graphic identifier identifying at least one of the graphics sources, to provide the graphic information for the corresponding page pixel from the identified graphics source, and the graphics arbitrator being further operable, when the examined pixel does not contain a graphic identifier identifying at least one of the graphics sources, to provide the graphic information for the corresponding page pixel from the examined pixel.

29. The control area network of claim 28, wherein each graphic identifier comprises a key color value.

30. The control area network of claim 29, wherein the display device includes a screen, the button properties further comprises:
a location of the button on the screen; and
size of the button.

31. The control area network of claim 29, wherein the at least two graphics sources comprise a video cassette recorder.

32. The control area network of claim 29, wherein the at least two graphics sources comprise a camera.

33. The control area network of claim 29, wherein the at least two graphics sources comprise a television signal receiver.

34. The control area network of claim 29, wherein the at least two graphics sources comprise a computer.

35. The control area network of claim 29, further comprising an editor configured to edit the button properties.

36. The control area network of claim 29, wherein the display device is a touch panel.

37. The control area network of claim 29, wherein one of the graphics sources is an internal pixel map.

38. A method of multimedia display on a display device, comprising:
- composing a display file describing at least one window of a page to be displayed on the display device, wherein each window is configured to display graphics information received from one or more graphics sources, each graphics source being identified by a corresponding graphic identifier;
- receiving a pixel from at least one of the graphics sources;
- generating an internal pixel map according to the display file;
- examining each pixel in the internal pixel map;
- providing the graphic information for the corresponding page pixel from the identified graphics source when an examined pixel contains a graphic identifier identifying at least one of the graphics sources; and
- providing the graphic information for the corresponding page pixel from the examined pixel when the examined pixel does not contain a graphic identifier identifying at least one of the graphics sources.

39. The method of claim 38, wherein each graphic identifier comprises a key color value.

40. The method of claim 38, further comprising displaying the provided graphic information.

41. The method of claim 38, wherein each graphic identifier uniquely identifies a respective one of the graphics sources.

42. The method of claim 38, further comprising outputting the selected pixel to the display device for display on a screen.

43. The method of claim 38, wherein one of the graphics sources comprises an internal pixel map.

44. A method of multimedia display on a display device comprising:
- receiving an internal pixel map according to a display file describing at least two windows, each window having a set of properties and configured to display graphics information received from a specified graphics source, the graphics source having a corresponding graphic identifier;
- examining each pixel in the internal pixel map;
- providing, when the examined pixel matches the graphic identifier of the specified graphics source, a corresponding pixel from the specified graphics source;
- providing, when the examined pixel does not match the graphic identifier, the examined pixel; and
- displaying the provided pixel on the display device.

45. The method of claim 44, wherein each window comprises a button.

46. The method of claim 45, further comprising generating the internal pixel map.

47. The method of claim 45, wherein the display device comprises a touch monitor screen.

48. The method of claim 45, wherein examining each pixel in the internal pixel map further comprises determining whether the examined pixel is equal to a key color.

49. The method of claim 45, further comprising assigning the graphic identifier to one of the buttons.

50. A computer program product for displaying multimedia on a display device, comprising:
- a first computer code for composing a display file describing at least one window of a page to be displayed on the display device, wherein each window is configured to display graphics information received from one or more graphics sources, each graphics source being identified by a corresponding graphic identifier;
- a second computer code for receiving a pixel from one of the graphics sources;
- a third computer code for generating an internal pixel map according to the display file;
- a fourth computer code for examining each pixel in the internal pixel map;
- a fifth computer code for providing the graphic information for the corresponding page pixel from the identified graphics source when an examined pixel contains a graphic identifier identifying at least one of the graphics sources; and
- a sixth computer code for providing the graphic information for the corresponding page pixel from the examined pixel when the examined pixel does not contain a graphic identifier identifying at least one of the graphics sources.

51. The computer program product of claim 50, wherein each graphic identifier comprises a key color value.

52. The computer program product of claim 50, further comprising a seventh computer code for displaying the provided graphic information.

53. A system for providing multimedia on a display device, comprising:
- one or more graphics sources, wherein each graphics source is configured to provide graphics information, each graphics source being identified by a corresponding graphic identifier;
- a display file defining a page having a plurality of page pixels to be displayed on the display device, the page including at least one window, wherein each window is configured to display graphics information received from at least one of the graphics sources;
- means for generating an internal pixel map according to the display file;
- means for examining each pixel in the internal pixel map;
- means for displaying, when an examined pixel contains a graphic identifier identifying at least one of the graphics sources, the graphic information for the corresponding page pixel from the identified graphics source; and
- means for displaying, when an examined pixel does not contain a graphic identifier identifying at least one of the graphics sources, the graphic information for the corresponding page pixel from the examined pixel.

54. The system of claim 53, wherein each graphic identifier comprises a key color value.

* * * * *